United States Patent
Carus et al.

[11] Patent Number: 6,035,268
[45] Date of Patent: Mar. 7, 2000

[54] METHOD AND APPARATUS FOR BREAKING WORDS IN A STREAM OF TEXT

[75] Inventors: Alwin B. Carus, Newton; Michael Wiesner, West Roxbury; Deborah Krause, Burlington, all of Mass.

[73] Assignee: Lernout & Hauspie Speech Products N.V., Ieper, Belgium

[21] Appl. No.: 08/915,628

[22] Filed: Aug. 21, 1997

Related U.S. Application Data

[60] Provisional application No. 60/023,426, Aug. 22, 1996.

[51] Int. Cl.[7] .................................................. G06F 15/38
[52] U.S. Cl. ........................................................... 704/9
[58] Field of Search ..................... 704/1, 9, 10; 707/530, 707/531, 532, 535; 341/28; 382/185

[56] References Cited

U.S. PATENT DOCUMENTS

| | | | |
|---|---|---|---|
| 5,029,084 | 7/1991 | Morohasi et al. | 364/419 |
| 5,268,840 | 12/1993 | Chang et al. | 364/419.08 |
| 5,299,124 | 3/1994 | Fukumochi et al. | 364/419.02 |
| 5,548,507 | 8/1996 | Martino et al. | 364/419.01 |
| 5,598,518 | 1/1997 | Saito | 395/793 |

FOREIGN PATENT DOCUMENTS 0 547 222  6/1993  European Pat. Off. ........ G06F 17/38

OTHER PUBLICATIONS

Teller, V. et al., "A Probabilistic Algorithm for Segmenting Non–Kanji Japanese Strings," *Proceedings of the 12th National Conference on Artifical Intelligence,* vol. 1, 742–7 (Jul. 31–Aug. 4, 1994).

*Primary Examiner*—Forester W. Isen
*Assistant Examiner*—Patrick N. Edouard
*Attorney, Agent, or Firm*—Bromberg & Sunstein LLP

[57] ABSTRACT

A word breaker utilizing a lexicon module and a processing module to identify word breaks in a stream of Asian (e.g. Japanese, Chinese, or Korean) language text. The lexicon module is a dictionary or database containing words native to the language of the input text. The processing module includes a plurality of analysis modules which operate on the input text. In particular, the processing module can include modules that analyze the input text using heuristic rules and statistical analysis to identify a first set of work breaks, thereby reducing the size of segments with undefined word breaks. The processing module also includes a database analysis module that identifies the remaining undefined word breaks in those smaller segments that have undergone heuristic or statistical analysis.

41 Claims, 6 Drawing Sheets

METHOD AND APPARATUS FOR BREAKING WORDS IN A STREAM OF TEXT

This application claims the benefit of U.S. Provisional Application No. 60/023,426, filed Aug. 22, 1996, and entitled Word Breaker.

FIELD OF THE INVENTION

The present invention relates to automated language analysis systems, and relates to such systems embodied in a computer for receiving digitally encoded text composed in a natural language. More particularly, the invention relates to an efficient and accurate method and apparatus for determining word breaks in digitally encoded Asian language text.

BACKGROUND OF THE INVENTION

Automated language analysis systems embedded in a computer typically include a lexicon module and a processing module. The lexicon module is a table of lexical information, such as a "dictionary" or database containing words native to the language of the input text. The processing module includes a plurality of analysis modules which operate upon the input text in order to process the text and generate a computer understandable semantic representation of the natural language text. Automated natural language analysis systems designed in this manner provide for an efficient language analyzer capable of achieving great benefits in performing tasks such as information retrieval.

Typically the processing of natural language text begins with the processing module fetching a continuous stream of electronic text from an input module. The processing module then decomposes the stream of natural language text into individual words, sentences, and messages. For instance, individual words in the English language can be identified by joining together a string of adjacent character codes between two consecutive occurrences of a white space code (i.e. a space, tab, or carriage return).

Japanese language text, and other Asian languages such as Chinese and Korean, can not be separated into individual words as easily as English language text. Asian language text typically includes a string of individual characters each separated by white-space. Words in these Asian languages are formed of a single character or a successive groups of characters, but the boundaries between the words are not explicitly identified in the written text. The written text does not clearly indicate whether any particular character forms a complete word or whether the particular character is only part of a word. In addition, the written characters may be from one or more character alphabets. For example, Japanese words may be formed in one of three character types: Katakana, Hiragana, Kanji, and Romaji characters. Identifying these ambiguous word boundaries between the characters proves important in electronically translating or processing Asian language documents.

Some prior art systems attempt to determine these word boundaries with simple pattern matching rules while other prior art systems resort to using a database of Asian language words to identify word breaks in Asian language text. For instance, U.S. Pat. No. 5,029,084, issued to Morohasi et al., discloses a system that combines various pattern matching approaches to determine word boundaries in the text. The Morohasi system identifies character divisions based on character type definitions (i.e. Katakana, Kanji, Hiragana) and then processes the sentence by comparing the characters to a content word dictionary containing Japanese words. For any character segments remaining after this initial processing, a series of compound word synthesizing rules are used to determine the division of the remaining segments. This system has the drawback of performing an up front costly comparison analysis of the characters in the stream of text with a content word dictionary of the Japanese language.

Other prior art systems use morpheme analysis to determine the word breaks in a Japanese language sentence. U.S. Pat. No. 5,268,840, issued to Chang et al., describes a method and apparatus for morphologizing text. The Chang system discloses segmenting the input text of characters into the longest morphemes that can be formed from the input text. This is achieved by forming the longest morpheme from the remaining characters in the sentence which is listed in a dictionary of valid morphemes and determining if it is conjunctive with the previously divided morpheme. The conjunctiveness of successive morphemes can be based upon grammar rules that require two adjacent morphemes to obey certain rules of connection.

Morphological analyzers of the type disclosed in Chang have efficiency problems. For example, subsequent identification of morphemes beyond the initially identified morpheme may indicate that the earlier identified morphemes are incorrect and require further analysis. This inherent recursive nature of the system causes inefficiencies in the processing of the input text. In addition, the morphological analysis of Chang requires two separate processing steps. In the first step, the system identifies the morphemes themselves and in the second step the system requires the application of the morphological rules to the entire document. Thus, a morphological analysis system typically requires considerable computer processing effort and frequent database accessing resulting in longer processing times, coupled with the ever present risk of needing to review and reassess earlier faulty analysis.

Accordingly, an object of the invention is to provide a word breaker that efficiently and accurately identifies word breaks in a stream of Asian language text.

Other general and specific objects of the invention will be apparent and evident from the accompanying drawings and the following description.

SUMMARY OF THE INVENTION

The invention provides an apparatus and method for identifying word breaks in Asian language text that overcomes the limitations in the above described techniques. In particular, the present invention achieves accuracy and efficiency by applying computationally expensive procedures to word segments having unidentified word breaks only after less computationally expensive procedures have been exploited to reduce the size of the word segments by unidentifiying word breaks. The invention discloses an apparatus that first analyzes the stream of text with computationally inexpensive processing, thereby reducing the size of the segments with undefined word breaks within the stream of text. The inventive system then analyzes these smaller segments with more computationally expensive processing in a manner that does not require reexamination of the earlier analysis steps.

For instance, one aspect of the word breaker includes an element for storing the input character string, a first memory element for storing a character-transition table, a second memory element for storing a dictionary, a statistical analysis module for reducing the number of unidentified word breaks in the stream of text, and a database analysis processor for locating the remaining unidentified words breaks in the stream of text. The statistical analysis module, a less computationally expensive process than a dictionary lookup, examines a first segment in the stream of text to locate a first word break. The statistical analysis module, using computationally inexpensive processes, then partitions the stream of text into at least a first sub-segment and a second sub-segment divided by the first word break. The first and second sub-segments are then analyzed using the more computationally expensive database analysis processor to identify the remaining word breaks in the first segment. The database analysis processor identifies the remaining word breaks by comparing the characters in the first and second sub-segments with entries in the dictionary stored in the second memory element.

The invention further provides for a statistical analysis processor that identifies the first word break with the aid of data stored in the character-transition table. For instance, the statistical processor can identify the first word break as a function of a statistical morpheme stored in the character-transition table. In one instance, the statistical processor can compare the characters in the first segment of the input stream with the entries in the character-transition table, and the statistical processor can then identify those characters in the stream of text that match entries in the character-transition table. Once a match is found, the statistical processor can then associate a character-transition tag with the matched characters in the stream of text. The associated character-transition tag identifies the existence of a concatenation between successive characters, a break between successive characters, or an unknown transition between successive characters.

Additional features of the statistical analysis processor provide for a windowing module for forming a window of successive characters from the stream of text. The windowing module also includes structure for comparing the window of successive characters with entries in the character-transition table. This allows a window of characters to be compared with entries in the character-transition table and to identify whether the window of characters forms a statistical morpheme as registered in the character-transition table.

Further in accordance with the windowing module, the invention can further include a processing element for sliding the window of successive characters along the first segment of the stream of text. This provides for a system that can compare successive groupings of characters within the stream of text with the entries in the character-transition table. Additionally, the windowing module can include a processing element that controls the number of characters in the window, that is the size of the sliding window. This allows various numbers of successive characters to be compared with the entries in the character-transition table.

Another aspect of the invention includes a heuristic rule table and a heuristic rule module for further reducing the number of possible character combinations forming words in the input stream of text. The heuristic rule module and its associated heuristic rule table are typically computationally inexpensive procedures that are applied before the database analysis processor is utilized, thereby reducing the size of word segments having unidentified word breaks that must be processed by the database analysis processor. The heuristic rule table and heuristic rule module can identify word breaks in the input character string; for Japanese, these are based upon numbers, punctuation, Roman letters, classifiers, particles, honorific prefixes, emperor years, and Kanji-Katakana character-transitions.

Other features of the invention include a word verification module for verifying matches between identified words in the input character string, and a character-transition table that includes character strings of morphemes that form a minimum spanning set necessary to identify character-transitions in the input character string. Additionally, the entries in the character-transition table can be of variable length.

One preferred method of the invention for locating unidentified word breaks in a input character string includes the steps of: storing the input character string, identifying a morpheme in a first segment of the input character string, reducing the number of unidentified word breaks in the input character string based upon the identified morpheme, and locating the remaining unidentified words breaks in the input character string by comparing the segments of the input string with a dictionary. This method employs computationally expensive procedures only after less expensive computational procedures have been employed to reduce the size of the segments having unidentified word breaks. For instance, the inventive method first identifies a word break in the input character string based upon a morpheme, the identified word break divides the input string into first and second sub-segments having the remaining unidentified word breaks. The first and second sub-segments are then analyzed using the computationally more expensive process of comparing the sub-segments with a dictionary.

An additional aspect of the invention provides for a machine readable storage medium having instructions stored thereon that direct a programmable computer to implement the word breaker disclosed herein. The instructions on the machine readable storage medium implement a first element for reducing the number of unidentified word breaks in a character string by locating a first word break in a first segment of the character string as a function of at least one statistical morpheme in the first segment, the first word break dividing the first segment into a first sub-segment and a second sub-segment, and a second element for locating substantially all of the remaining unidentified word breaks in the first and second sub-segments by comparing the first and second sub-segments with entries in a dictionary of lexical entries.

DETAILED DESCRIPTION

Figure 1:
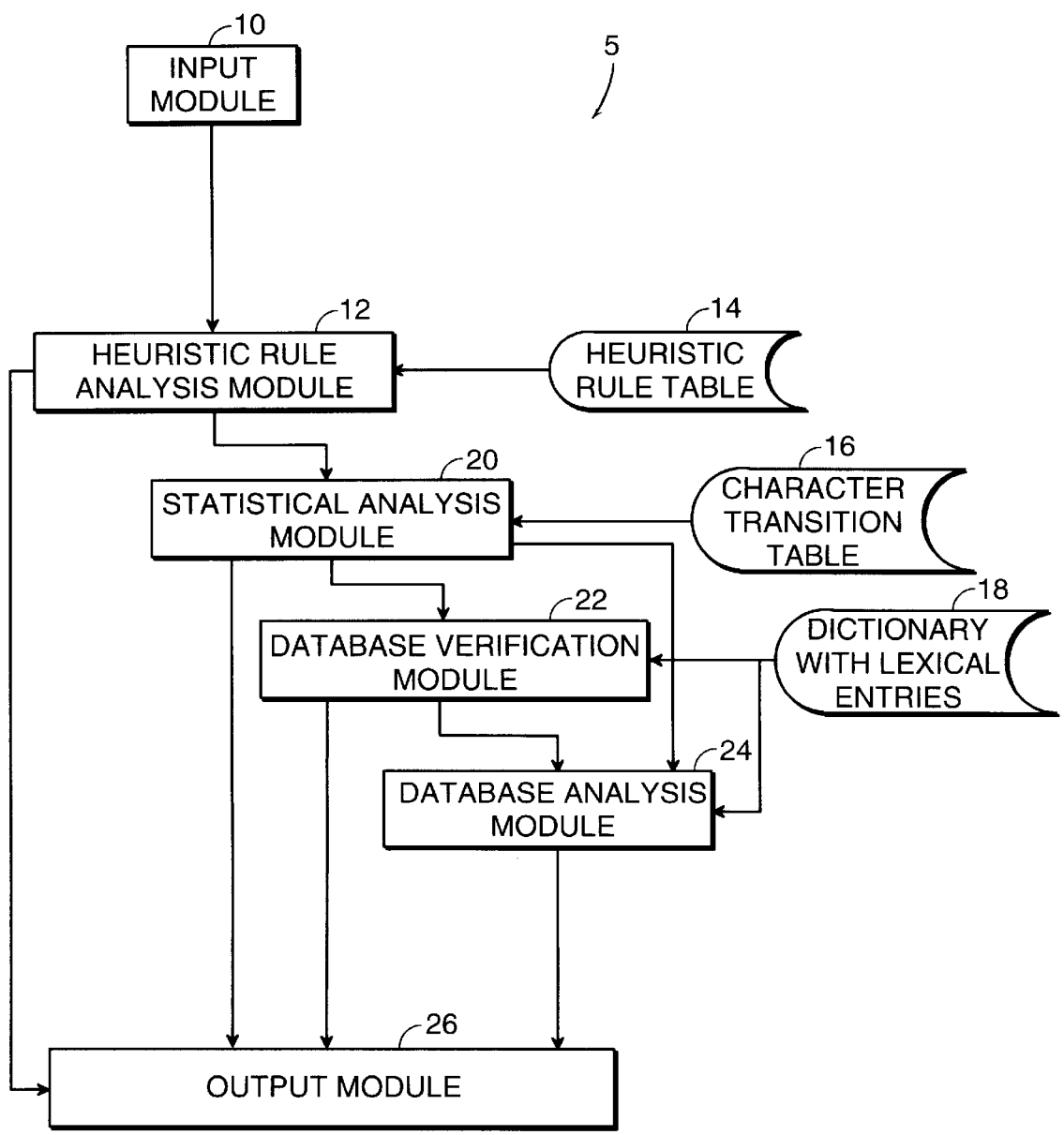
FIG. 1 is a block diagram of a word breaker according to the present invention.

FIG. 1 illustrates a word breaker 5 in accordance with the invention. The word breaker 5 comprises a processing module operably coupled with a lexicon module. The processing module can include a statistical analysis module 20, a database analysis module 24, an optional heuristic rule analysis module 12, and an optional database verification module 22. The separate sub-modules 12, 20, 22 and 24 of the processing module are operably coupled together to allow the transfer of data and control signals between the sub-modules. The lexicon module can include a character-transition table 16, a dictionary 18 with lexical entries, and an optional heuristic rule table 14. The character-transition table 16 is operably coupled with the statistical analysis module 20, the dictionary 18 is operably coupled with the database verification module 22 and with the database analysis module 24, and the heuristic rule table 14 is operably coupled with the heuristic rule analysis module 12. As further illustrated in FIG. 1, the word breaker 5 can include an input module 10 for receiving the stream of input text and an output module 26 for generating an output signal representative of the stream of input text with identified word breaks.

The word breaker 5 can be implemented using electronic hardware devices, software, or a combination of the two. For example, a digital computer running a UNIX platform can be loaded with software instructions to implement the structure and processes of the word breaker 5. The input module 10 can be a keyboard, a text processor, a machine readable storage device, or any other structure capable of generating or transferring a stream of text. The processing module and its sub-modules 12, 20, 22 and 24 can be implemented through software instructions executed by the processor in the digital computer or by specifically designed hardware components implementing the equivalent instruction set. The lexical module and its sub-modules 14, 16 and 18 can be implemented by tables stored in a volatile or a non-volatile memory device that is operably coupled with the processing module. The output module can be implemented using any device capable of storing, displaying, or transferring the signals generated by the processing module of the invention. For instance the output module can include a SCSI hard drive, electronic memory devices, or a video monitor.

In operation, the input module 10 either receives or generates the input stream of text that requires identification of word boundaries. The input module 10 can either pre-process the text or it can directly transfer the stream of incoming text to the heuristic rule analysis module 12. For instance, the stream of Japanese text entering the input module 10 can be represented electronically using JIS (Japanese Industry Standard), Shift-JIS, EUC (Extended Unix Code) or Unicode, wherein each Japanese character is represented by two bytes, but the input data can contain single-byte or double-byte characters. It is preferable to have the Japanese text represented in one standard format, such as Unicode. Accordingly, the input module 10 advantageously provides pre-processing to convert the input stream of text into a standard format, such as Unicode.

The input module 10 can also associate tags with each character in the input stream of text. The tags associated with each electronic equivalent of the characters identify attributes of the characters. In particular, a character-transition tag can be associated with each character such that the character-transition tag identifies word breaks between characters in the input stream of text. For instance, in the present invention, character-transitions can be represented as a tri-state value with a 0 representing an unknown transition, a 1 representing an a break between the characters, and a 2 representing that there is a link, i.e., a concatenation, between the characters. Each transition is represented by a two-bit flag and accordingly the bit values for UNKNOWN, BREAK, and LINK are 00, 01, and 10 respectively. For an "N" character pattern, there are "N+1" of these bit pairs which are necessary to completely represent the transition. For example:

the pattern |A_B?C|;
wherein: "|" indicates a break,
"_" indicates a link, and
"?" indication an unknown transition;
can have character-transition tags represented as: 01 10 00 01.

The optional heuristic rule module 12 receives the stream of text from the input module 10 and transmits a heuristically processed stream of text to the statistical analysis module 20. Alternatively, the heuristic module can be removed from the word breaker 5 such that the stream of text output by the input module 10 passes directly to the statistical analysis module 20.

In general, the heuristic rule analysis module 12 identifies a character-transition in the character stream such that the number of possible character combinations forming words in the character string are reduced. For example, the heuristic rule module can identify character-transitions based on a classification of the character type, wherein the character-transitions identify either word breaks between successive characters, a link between successive characters, or an unknown transition between successive characters. The heuristic rule module 12 acts in cooperation with the heuristic rule table 14 to identify the character-transitions in the character stream.

Once the character-transitions are identified the heuristic rule module sets the character-transition tags associated with each identified character-transition to either a either a break between characters, or a link between characters. The heuristic rule module 12 then passes all character-transition tag data to the statistical rule module 14. The statistical rule module reads the character-transition tag data and analyzes only those segments having unknown interior character-transitions.

The statistical analysis module 20 either receives a stream of data from the optional heuristic rule analysis module 12 or from the input module 10. The statistical analysis module reduces the number of unidentified word breaks in the character string based upon a statistical morpheme in the character string. A statistical morpheme is a morpheme that is identified based upon a statistical analysis of the frequency of occurence of the morpheme in a corpus of text. The statistical analysis module cooperates with the character-transition table 16 to identify the statistical morphemes in the input character stream.

In operation, the statistical analysis module 20 analyzes all remaining unknown character-transitions in the input text by comparing a sequence of characters containing unknown character-transitions in the input text to sequences of characters stored in the character-transition table 16. The character-transition table 16 contains entries of character segments, i.e. statistical morphemes, which are chosen to statistically predict a character-transition based on the order of characters. Accordingly, a character-transition tag associated with the input character stream can be set when a sequence of characters in the input text match an entry in the character-transition table. In those aspects of the invention wherein the word breaker 5 utilizes both the heuristic analysis module 12 and statistical analysis module 20, it is estimated that approximately 90% of the character-transitions in the input character stream are accurately identified.

After processing of the stream of text by the statistical analysis module 20, the input character stream can be either processed by the database verification module 22, the database analysis module 24, or directly by the output module 26. For instance, when the input character stream has no remaining unidentified character-transitions after processing by the statistical analysis module 20, processing procedes directly to the output module 26.

The database verification module 22 is an optional module that compares the input text segments identified as words by the character breaks, to lexical entries contained in the dictionary 18. If the word is correct and properly verified it is passed to the output module. After processing by the verification module, which includes adjustments or corrections of spurious word forms that remain after statistical analysis, approximately 95% of the character-transitions are accurately identified. The remaining unknown input text segments with character-transitions are passed to the database analysis module 24. The database analysis module 24 compares the remaining unknown character-transitions to the lexical entries in the dictionary 18 to determine the final word breaks. The text, now with spaces between the words, is passed to the output module 26.

Figure 2:
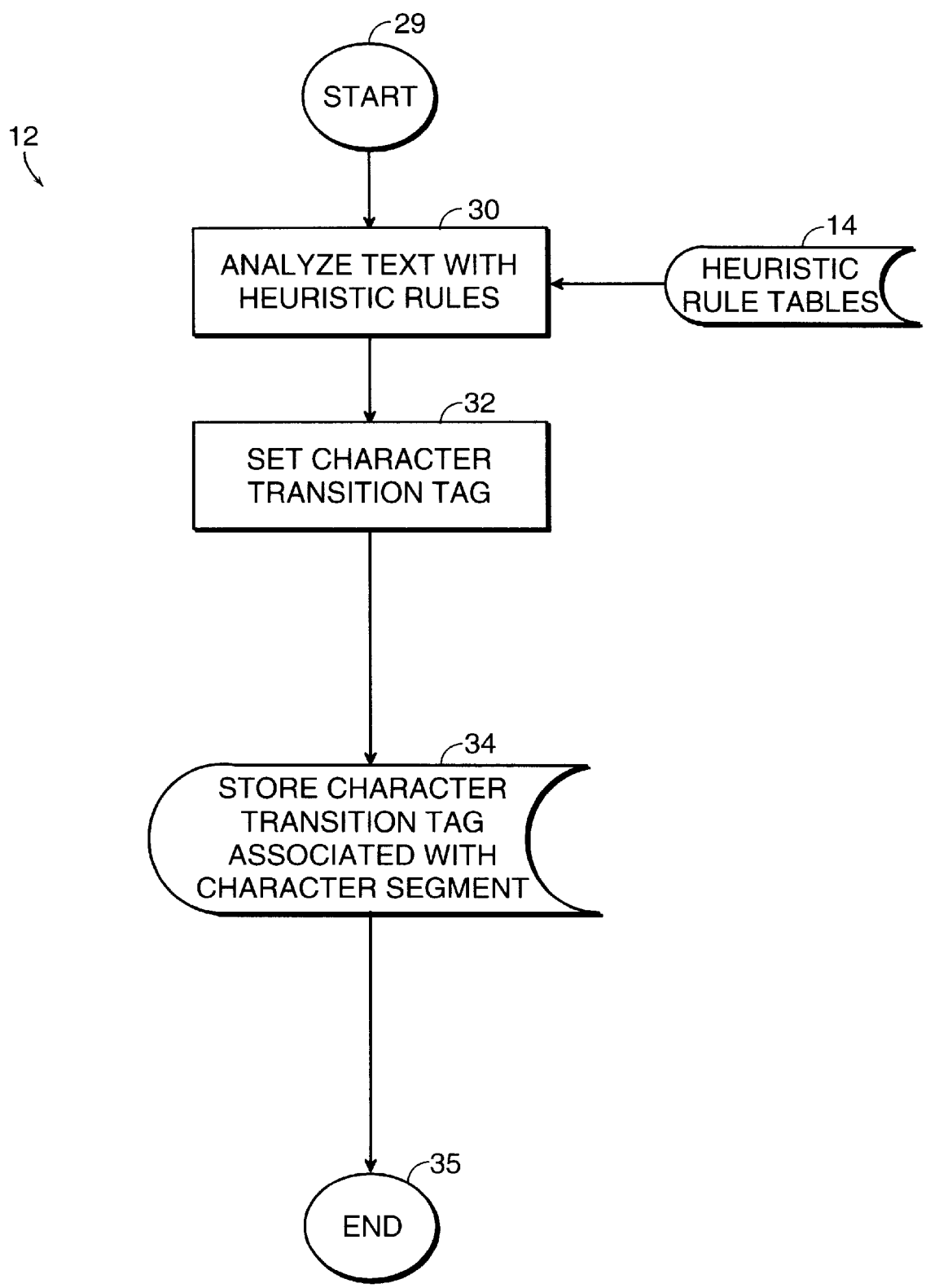
FIG. 2 is a flow chart illustrating the processing steps of the heuristic rule analysis module of FIG. 1.

FIG. 2 illustrates a flow diagram for implementing the heuristic rule analysis module 12. The heuristic rule module in cooperation with a heuristic rule table identifies characters in the text that consistently identify character-transitions, i.e., a break between characters or a link between characters. For example, in one embodiment of the present invention the heuristic rule module identifies character-transitions formed by numbers, Roman letters, punctuation marks, classifiers, particle delimiters, repeat characters, honorific prefixes, Kana/Kanji combinations, and end of sentence markers.

After a character-transition is identified, the heuristic rule module sets a character-transition tag associated with each character to either a break or a link. Once a character-transition tag is set, the character-transition tag need not be modified by any further processing because of the accuracy of the processing used to set the character-transition tags. The results from the heuristic rule analysis module 12 may be one of three types: 1) an identified word; 2) a segment with unknown interior character-transitions; 3) and an unidentified segment. An identified word is one in which there is a break before the first character and after the last character with all character-transitions set as a link in the interior of the identified word. A segment with unknown character-transitions will have a break before the first character and after the last character, but will have at least one unknown character-transition in the interior of the segment. An unidentified segment is a succession of characters having an insufficient number of character-transitions identified to qualify as either an identified word or a segment with unknown interior character-transitions.

With further reference to FIG. 2, the heuristic rule module begins execution at step 29 wherein the input data stream is transferred to the heuristic rule module 12 for processing. After step 29, step 30 is executed.

Step 30 analyses the input stream of text with a set of heuristic rules for identifying character-transitions in the stream of text based on the classification of the characters. In one aspect of the invention, this is accomplished by comparing the characters in the input stream of text with a classification system or set of rules stored in either the heuristic rule table 14 or the heuristic rule analysis module 12. For example, in one embodiment the classification system classifies the characters according to whether the characters consist of numbers, Roman letters, punctuation marks, classifiers (i.e., currency characters, time and date characters), particle delimiters, end of sentence characters, Kanji and Kana repeat characters, katakana/kanji combination characters, or emperor year characters. Based on the classification of any particular character, a character-transition tag associated with the particular character can be set, as shown in Step 32 of FIG. 2.

All forms of numbers—single and double-byte Arabic numerals, kanji standard and bank digits, and power of ten characters—are identified as a word segment by the heuristic rule module 12. In addition, numbers followed by any of the time, emperor year, or currency classifiers would be marked as a number and time, date, or currency respectively.

The heuristic rule module 12 also identifies a string of single-byte Romaji letters (whether English, Western European, Greek, or Cyrillic) as one word segment. The segment begins at the first Romaji letter the word breaker encounters and ends at the last consecutive Romaji letter.

The heuristic rule module also places word breaks before and after each character in the stream of text that is classified as a punctuation mark. Although, commas and decimal points used in numbers will not have a word break placed before or after the comma or decimal point. Table 1 is a representative table that identifies whether characters in the stream of text are to be classified as punctuation marks.

TABLE 1

Punctuation Marks

Phrasal Marks
[d = double-byte; s = single-byte]

| , | (Japanese comma) | : | (s) |
|---|---|---|---|
| ○ | (maru) | ; | (d) |
| ' | (d) | ; | (s) |
| , | (s) | ? | (d) |
| - | (d) | ? | (s) |
| - | (s) | ! | (d) |
| . | (d) | ! | (s) |
| : | (d) | ... | (d) |

Range marks:

| ~ | (d) |
| — | (d) |
| - | (d) |
| - | (s) |
| – | (d-byte minus sign) |
| / | (d) |
| \ | (d) |

Quotation marks

| " | (d) | 「 | (d) |
|---|---|---|---|
| " | (d) | 」 | (d) |
| ' | (d) | " | (d) |
| ' | (d) | " | (d) |
| 「 | (d) | " | (s) |
| 」 | (d) | ' | (s) |

Brackets & Parentheses

| [ | | 》 | |
|---|---|---|---|
| ] | | 《 | |
| << | | ] | |
| < | | ] | (d) |
| > | | ( | [s] |
| { | | ) | [s] |
| } | | ( | [d] |
| [ | (s) | ) | [d] |
| ] | (s) | < | (d) |
| [ | (d) | > | (d) |

Other symbols/punctuation marks

| ° | (d --- degree) | ≠ | (d) |
|---|---|---|---|
| ° C. | (d --- degree centigrade) | ≦ | (d) |
| % | (d) | ≧ | (d) |
| % | (s) | ∞ | (d) |
| # | (d) | ∴ | (d) |
| # | (s) | ♂ | (d) |
| @ | (d) | ♀ | (d) |
| @ | (s) | ' | (d ... minutes) |
| & | (d) | " | (d ... seconds) |

TABLE 1-continued

Punctuation Marks

| | | | |
|---|---|---|---|
| & | (s) | 〒 | (d . . . zip code symbol) |
| ※ | (d) | ¥ | (d) |
| * | (s) | ￥ | (s) |
| = | (d) | $ | (d) |
| ＝ | (s) | ＄ | (s) |
| + | (d) | £ | (d) |
| ＋ | (s) | ¢ | (d) |
| ± | (d) | 〃 | (number, phrase repeat sign) |
| × | (d) | 〆 | (symbol which replaces "しめ" or "締") |
| ÷ | (d) | | |
| Bullets | | | |

| | | | | |
|---|---|---|---|---|
| ☆ | ○ | ◆ | □ | ▽ |
| ★ | ● | ◇ | △ | ▼ |
| ※ | ◎ | ■ | ▲ | § |

Table 2 represents a list of classifiers, both general and specific classifiers (such as time and currency) used by the heuristic rule module 12 to identify character-transitions. In general a classifier will follow the number expression it is classifying. Only those classifiers identified in Table 2 as "currency classifiers Part 2" precede the number expression. Any time the number is preceded or followed by a classifier the number expression includes the classifier as part of the word. That is, there should be no break between the number and the classifier.

TABLE 2

Classifiers
The asterisk in the tables below indicates that the classifier can also be a word by itself.

General Classifiers

| | | | | | |
|---|---|---|---|---|---|
| 便* | 4fbf | 州* | 5dd2 | 箇所 | 7b87,6240 |
| 台* | 53f0 | 羽* | 7fbd | ケ所 | 30f6,6240 |
| 段* | 6bb6 | され* | 304d,308c | 個所 | 500b,6240 |
| 度* | 5ea6 | 缶* | 7f36 | カ所 | 30f5,6240 |
| 束* | 675f | パック* | 30d1,30c3,30af | ヵ所 | 30ab,6240 |
| ヵ所* | 628a | かん* | 304b,3093 | 切れ | 5207,308c |
| 箱* | 7bb1 | カン* | 30ab,30f3 | ケ月 | 30f6,6708 |
| 発* | 767a | 瓶* | 74f6 | カ月 | 30f5,6708 |
| 歳* | 756a | ビン* | 30d3,30f3 | ヵ月 | 30ab,6708 |
| 本* | 672c | びん* | 3073,3093 | 箇月 | 7b87,6708 |
| 回* | 56de | 時間* | 6642,9593 | 箇条 | 7b87,6761 |
| 軒* | 8ed2 | 年度* | 5e74,5ea6 | ケ条 | 30f6,6761 |
| 脚* | 811a | 種* | 7a2e | カ条 | 30f5,6761 |
| 名* | 540d | 匹 | 5339 | ヵ条 | 30ab,6761 |
| 両* | 4e21 | 箇 | 7b87 | ケ国 | 30f6,56fd |
| 粒* | 7c92 | 個 | 500b | カ国 | 30f5,56fd |
| 山* | 5c71 | 枚 | 679a | ヵ国 | 30ab,56fd |
| 社* | 793e | 流 | 6d41 | カ国語 | 30ab,56fd,8a9e |
| 組* | 7d44 | 歳 | 6b73 | ケ国語 | 30f6,56fd,8a9e |
| 足* | 8db3 | 冊 | 518a | ヵ国語 | 30f5,56fd,8a9e |
| 摘* | 63c3 | 隻 | 96bb | 語 | 8a9e |
| 揃い* | 63c3,3044 | 周 | 5468 | 、 | 3053 |
| 袋* | 888b | 艘 | 8258 | 一 | 30b3 |
| 若* | 7740 | 挺 | 633a | 銭* | 92ad |
| 丁* | 4e01 | 通 | 901a | セント | 30bb,30f3,30c8 |
| 頭* | 982d | ケ | 30f6 | ｾ | 3323 |
| 棟* | 68df | ヶ | 30b1 | 割 | 5272 |
| 人* | 4eba | っ | 3064 | | |
| 挺* | 6a5f | 錠 | 9320 | *条 | 6761 has been |

TABLE 2-continued

Classifiers
The asterisk in the tables below indicates that the classifier can also be a word by itself.

| | | | | |
|---|---|---|---|---|
| 畳* | 7573 | 才 | 624d | removed as |
| 県* | 770c | 階 | 968e | of 7/29/96 |
| 市* | 5e02 | 件 | 4ef6 | |

Time/Date Classifiers: (These always FOLLOW numbers)

| | | |
|---|---|---|
| 時 | 6642 | Hour |
| 時半 | 6642,9593 | Half Hour |
| 分 | 5206 | Minute |
| 日 | 65E5 | Day |
| 月 | 6708 | Month |
| 年 | 5E74 | Year |
| 秒 | 79D2 | Second |

Currency Classifiers Part 1: (These FOLLOW the number)

| | | |
|---|---|---|
| 円 | 5186 | Yen |
| 弗 | 5f17 | Dollar |
| ドル | 30c9,30eb | Dollar |
| ﾄﾞﾙ | 3326 | Dollar |
| フラン | 30d5,30e9,30f3 | Franc |
| 羽 | 30de,30eb,30af | Mark |
| マルク | 30da,30bd | Peso |
| 元 | 5143 | Yuan |
| ウオン | 30a6,30aa,30f3 | Won |
| 囲 | 5713 | Yuan |
| ルーブル | 30eb,30fc,30d6,30eb | Ruble |
| リラ | 30ea,30e9 | Lira |
| ??(not supported by Shift-JIS) | 3306 | Won (Korea) |
| ??(not supported by Shift-JIS) | 3307 | Escudo (Portugal) |
| ??(not supported by Shift-JIS) | 3313 | Guilders |
| ??(not supported by Shift-JIS) | 331a | New Cruzeiro (Brazil) |
| ??(not supported by Shift-JIS) | 331b | Krone (Generic) |
| ??(not supported by Shift-JIS) | 331d | Kroruna (Czech Republic) |
| ??(not supported by Shift-JIS) | 3321 | Schilling (Austria) |
| ??(not supported by Shift-JIS) | 3340 | Pound (Great Britain, etc.) |
| ??(not supported by Shift-JIS) | 3350 | Yuan (People's Republic of China) |
| ??(not supported by Shift-JIS) | 3352 | Lira (Italy, San Marino, Vatican) |
| ??(not supported by Shift-JIS) | 3353 | Rupee (India) |
| ??(not supported by Shift-JIS) | 3354 | Squared Ruble |
| ??(not supported by Shift-JIS) | 3335 | Squared Franc |
| ??(not supported by Shift-JIS) | 3337 | Squared Peso |
| ??(not supported by Shift-JIS) | 3338 | Squared Penih |
| ??(not supported by Shift-JIS) | 333a | Squared Pence |
| ??(not supported by Shift-JIS) | 3346 | Squared Mark |

Currency Classifiers Part 2: (These PRECEDE number)

| | | |
|---|---|---|
| $ | 0024 | USD |
| ¥ | 00A5 | JPY |
| ￥ | FFE5 | JPY |
| ＄ | FF04 | USD |
| £ | FFE1 | PND |
| ¥ | FE69 | JPY same as single-byte YEN 00A5 |
| ?? | FFE6 | KPW (Korean Won sign - not available in shift-JIS). |

Table 3 represents a list of particle delimiters used by the heuristic rule analysis module 12 to identify further character-transitions in the stream of text. The right hand column lists rules specific to the particle or function shown in the left hand column. The rules listed in the right hand column of Table 3 are translated according to the following code: BB=break immediately before the particle; BA=break immediately after the particle; K[n]=kanji; T=katakana; H=hiragana; and Pnc=punctuation mark.

TABLE 3

Particle/Function Word Delimiters
3.1. Particle/Function Word Delimiters for Word-breaking

| Delimiter [pronounciation] | Unicode Value | Rule |
|---|---|---|
| を [wo] | 3092 | BB BA |
| ヲ [wo] | 30f2 | BB BA |
| 迄 [made] | 8fc4 | BB BA |
| 然 [shirari] | 7136,308a | BB BA if followed by a K |
| 尚 [nao] | 5c1a | BB BA if followed by a comma |
| だが [daga] | 3060,304c | BB BA only of at BOS (precceded by maru) |
| なぁ [naa] | 306a, 3041 | BB BA |
| 例えば [tatoeba] | 4f8b,3048,3070 | BB BA |
| 然るに [shikaruni] | 7136,308b,306b | BB BA |
| すなはち [sunawachi] | 3059,306a,306f,3061 | BB BA |
| なぜならば [nazenaraba] | 306a,305c,306a,3089,3070 | BB BA |
| それゆえに [soreyueni] | 305d,308c,3086,3048,306b | BB BA |
| それどころか [soredokoroka] | 305d,308c,3052,308d,304b | BB BA |
| 若しくは [moshikuwa] | 82e5,3057,304f,306f | BB BA |
| 乃至 [naishi] | 4e43,81f3 | BB BA |
| 或は [aruiwa] | 6216,306f | BB BA |
| 即ち [sunawachi] | 5373,3061 | BB BA |
| 但し [tadashi] | 4f46,3057 | BB BA if not followed by "書き" |
| 或いは [aruiwa] | 6216,3044,306f | BB BA |
| あるいは [aruiwa] | 3042,308b,3044,306f | BB BA |
| それでは [soredewa] | 305d,308c,3067,306f | BB BA |
| それなら [sorenara] | 305d,308c,306a,3089 | BB BA |
| それとも [soretomo] | 305d,308c,3068,3082 | BB BA |
| すなわち [sunawachi] | 3059,306a,308f,3061 | BB BA |
| が [ga] | 304c | BB BA if preceded by a K1 && followed by a K2 && "K1 が K2" is NOT a gaword.tbl<br>BB BA if preceded by a K && followed by T or Pnc && K is NOT any of {<br>0x6211 #我<br>0x543e #吾<br>0x6b6f #齒<br>0x4e57 #乗 }<br>BB BA if preceded by T && followed by K or T or Pnc<br>BB BA if preceded by Pnc && followed by K or T<br>BA if preceded by H && followed by T<br>BA if preceded by H && followed by K && K is NOT in gasuffix.tbl<br>BB if preceded by T && followed by H |
| は [wa] | 306f | BB BA if preceded && followed by K<br>BB BA if preceded && followed by T<br>BB BA if preceded by T && followed by K or Pnc<br>BB BA of [receded bu L && followed by T or Pnc && K is NOT any of {<br>0x62a6 #或<br>0x53c8 #又<br>0x5b9f #実 }<br>BA if followed by K && K is NOT {0x866b #虫 }<br>BA if followed by T<br>BB if preceded by T<br>BB if preceded by K && K is NOT any of { |

TABLE 3-continued

Particle/Function Word Delimiters
3.1. Particle/Function Word Delimiters for Word-breaking

| Delimiter [pronounciation] | Unicode Value | Rule |
|---|---|---|
| | | 0x62a6 #或 |
| | | 0x53c8 #又 |
| | | 0x5b9f #實 |
| ヘ [e] | 3078 | BB BA if preceded by K or T or Pnc && followed by K or T or Pnc |
| | | BA if preceded by H && followed by T |
| | | BB if preceded by T && followed by H |
| の [no] | 306e | BB BA if preceded && followed by K && "K の K" is NOT in noword.tbl |
| | | BB BA if preceded by K && followed by T or Pnc |
| | | BB BA if preceded by T && followed by K or Pnc or T |
| | | BA if preceded by H && followed by T |
| | | BB if preceded by T && followed by H |
| まで [made] | 307e,3067 | BB BA if preceded by T or K or Pnc |
| | | BA if preceded by H && followed by K or T or Pnc |
| にて [nite] | 306b,3066 | BB BA if preceded by K && followed by K or T or Pnc |
| | | BB BA if preceded by T && followed by K or T or Pnc |
| だけ [dake] | 3060,3051 | BB BA if preceded by K && followed by K or T |
| | | BB BA if preceded by T && followed by K or T or Pnc |
| | | BB BA if preceded by Pnc && followed by K or T |
| こそ [koso] | 3053,305d | BB BA if preceded by K or T or Pnc && followed by K or T or Pnc |
| すら [sura] | 3059 | BB BA if preceded by K or T or Pnc && followed by K or T or Pnc |
| や [ya] | 3084 | BB BA if preceded by K1 or T or Pnc && followed by K2 or T or Pnc && K1 is NOT {0x51b7 #冷 } |
| なり [nari] | 306a,308a | BB BA if preceded && followed by K |
| | | BB BA if preceded && by followed by T |
| で | 3067 | BB BA if preceded by K1 && followed by K2 or Pnc or T && K1 is NOT any of { |
| | | 0x6c5a, #汚 |
| | | 0x79c0, #秀 |
| | | 0x51fa, #出 |
| | | 0x594f, #奏 |
| | | 0x6c88, #沈 |
| | | 0x982d, #頭 |
| | | 0x64ab, #撫 |
| | | 0x788c, #碌 |
| | | 0x8399, #茹 } |
| | | && K2 is NOT any of { |
| | | 0x6e6f, #湯 |
| | | 0x7abc, #立 |
| | | 0x5207, #切 |
| | | 0x7121, #無 |
| | | 0x7389, #玉 |
| | | 0x7db2, #網 |
| | | 0x53e3, #口 |
| | | 0x5c71, #山 |
| | | 0x77f3, #石 |
| | | 0x76e4, #盤 |
| | | 0x5408, #合 |
| | | 0x9eba, #麺 } |
| | | BB BA if preceded && followed by T |
| | | BB BA if preceded by T and followed by K or Pnc |
| | | BB if preceded by T |
| | | BB if preceded by K which is NOT any of { |
| | | 0x6c5a, #汚 |
| | | 0x79c0, #秀 |
| | | 0x51fa, #出 |
| | | 0x594f, #奏 |
| | | 0x6c88, #沈 |
| | | 0x982d, #頭 |
| | | 0x64ab, #撫 |
| | | 0x788c, #碌 |
| | | 0x8339, #茹 |

TABLE 3-continued

Particle/Function Word Delimiters
3.1. Particle/Function Word Delimiters for Word-breaking

| Delimiter [pronounciation] | Unicode Value | Rule |
|---|---|---|
| と [to] | 3068 | BA if followed by T<br>BA if followed by K which is NOT any of {<br>0x6e6f, # 渇<br>0x7abc, # 立<br>0x5207, # 切<br>0x7121, # 無<br>0x7389, # 玉<br>0x7db2, # 絹<br>0x53e3, # 口<br>0x5c71, # 山<br>0x77f3, # 石<br>0x76e4, # 盤<br>0x5408, # 合<br>0x9eba, # 麺<br>BB BA if preceded by T or Pnc && followed by K or T or Pnc<br>BB BA if preceded by K1 && followed by K2 or T or Pnc && K1 is NOT in topprefix.tbl && K2 is NOT any of {<br>0x8ffd # 追<br>0x71c3 # 燃<br>0x611b # 愛<br>0x77f3 # 石<br>0x5ea7 # 座<br>0x9803 # 頃<br>0x76ae # 皮 }<br>BB if preceded by T<br>BB if preceded by K && K is NOT topprefix.tbl<br>BA if followed by T<br>BA if followed by K && K is NOT any of {<br>0x8ffd # 追<br>0x71c3 # 燃<br>0x611b # 愛<br>0x77f3 # 石<br>0x5ea7 # 座<br>0x9803 # 頃<br>0x76ae # 皮 } |
| から [kara] | 304b,3089 | BB BA if preceded by K or T or Pnc && followed by T or Pnc<br>BB BA if preceded by T or Pnc && followed by K && K is NOT in karasuf.tbl<br>BB BA if preceded by K1 && followed by k2 && K1 is NOT any of {<br>0x4ed8 # 付<br>0x5132 # 儲<br>0x5206 # 分<br>0x52a9 # 助<br>0x61f8 # 懸<br>0x639b # 掛<br>0x67b6 # 架<br>0x81ea # 自<br>0x9060 # 遠<br>0x9810 # 預 } && K2 NOT in karasuf.tbl<br>BB if preceded by T<br>BB if preceded by K && K is NOT any of {<br>0x4ed8 # 付<br>0x5132 # 儲<br>0x5206 # 分<br>0x52a9 # 助<br>0x51f8 # 懸<br>0x639b # 掛<br>0x67b6 # 架<br>0x81ea # 自<br>0x9060 # 遠<br>0x9810 # 預 } |

TABLE 3-continued

Particle/Function Word Delimiters
3.1. Particle/Function Word Delimiters for Word-breaking

| Delimiter [pronounciation] | Unicode Value | Rule |
|---|---|---|
| に [ni] | 306b | BA if followed by T<br>BA if followed by K && K is NOT in karasuf.tbl<br>BA if followed by T<br>BA if followed by K && K is NOT any of {<br>0x76ee, #目<br>0x80a1, #肢<br>0x76ae #皮 } |
| も [mo] | 3082 | BB BA if preceded by T && followed by T or K Pnc<br>BB BA if preceded by Pnc && followed by T or K<br>BB BA ifp[recedefbyn K1 && followed by K2 && K1 is NOT in moprefix.tbl && K2 is NOT any of {<br>0x819c #模<br>0x639b #搭 }<br>BB if preceded by K && K is NOT in moprefix.tbl<br>BA if followed by K && K is NOT any of {<br>0x819c #模<br>0x639b #搭 }<br>BA if followed by T |
| です | | BB BA if followed by Pnc |

Table 4 represents a list of Kanji and Kana (i.e. Kana is equivalent to Katakana and Hiragana) repeat characters used by the heuristic rule analysis module 12 to identify additional character-transitions in the stream of text. None of the repeat characters identified in Table 4 may start a word.

TABLE 4

Repeat Characters

々= unc 3005: sjs 8158; jis 2139; euc a1b9
ゝ= unc 309d: sjs 8154; jis 2135; euc a1b5
ゞ= unc 309e: sjs 8155; jis 2136; euc a1b6
ヽ= unc 30fd: sjs 8152; jis 2133; euc a1b3
ヾ= unc 30fe: sjs 8153; jis 2134; euc a1b4

Table 5 represents the honorific prefixes utilized by the heuristic rule analysis module 12 to identify additional character-transitions in the stream of text. If character [i] is an honorific prefix look at [i+1] and [i-1] and see if that character is found in the following table. If found, there is no break between any character, if only one character is found place a break between the character that was found and the honorific prefix.

TABLE 5

Honorific Prefix

Suffix Table

| | | | | | | | | | | | | | | |
|---|---|---|---|---|---|---|---|---|---|---|---|---|---|---|
| 歌 | 6b4c | 仁 | 4ec1 | 所 | 6240 | 幸 | 5e78 | 座 | 5ae7 |
| 伽 | 4f3d | 膳 | 81b3 | 前 | 524d | 形 | 5f62 | 茵 | 8597 |
| 中 | 4e2d | 用 | 7528 | 浜 | 6d5c | 光 | 5149 | 宅 | 5b85 |
| 意 | 610f | 陵 | 9675 | 船 | 8239 | 酒 | 6d12 | 堅 | 89a7 |
| 衣 | 8863 | 料 | 6599 | 蔵 | 8535 | 亡 | 4ea1 | 破 | 7834 |
| 宇 | 5b87 | 詠 | 8a60 | 荘 | 8358 | 大 | 5927 | 者 | 8005 |
| 苑 | 82d1 | 弊 | 5f0a | 園 | 5712 | 岳 | 5cb3 | 弓 | 5f13 |
| 慶 | 6176 | 法 | 6cd5 | 嵩 | 5d69 | 宿 | 5bbf | 虎 | 864e |
| 史 | 53f2 | 坊 | 574a | 津 | 6d25 | 曹 | 66f9 | 強 | 5f37 |

TABLE 5-continued

Honorific Prefix

| | | | | | | | | | | | |
|---|---|---|---|---|---|---|---|---|---|---|---|
| 亜 | 74bd | 殴 | 6bbf | 仕 | 6756 | の | 306e | 侠 | 4fa0 |
| 裂 | 88fd | 三 | 4e09 | 調 | 8abf | 転 | 8ee2 | 祖 | 7956 |
| | | 食 | 98df | 息 | 606f | 旅 | 7c3e | | |
| | | 修 | 4fee | 統 | 7d71 | 僕 | 994c | | |

Prefix Table

| | | | | | | |
|---|---|---|---|---|---|---|
| 久 | 4e45 | 姉 | 59c9 | 身 | 8eab |
| 削 | 5236 | 姐 | 59d0 | 還 | 9084 |
| 北 | 5317 | 崩 | 5d29 | 防 | 9632 |
| 大 | 5928 | 渡 | 6e21 | | |
| 女 | 5973 | 統 | 7d71 | | |

A character switch between kanji to katakana or katakana to kanji usually indicates a word break with some exceptions. Table 6 represents the exceptions to this rule. For this rule to apply there must be a string of at least 4 or more katakana characters. When there are less than 4 katakana characters in a string, the heuristic rule module 12 does not place any breaks.

If the Kanji character immediately proceeding a katakana string of 4 or more characters matches with any of those in table 6, the heuristic rule module 12 does not place any breaks, otherwise the heuristic rule module 12 places a break between the kanji and the first katakana character. If the kanji immediately following a katakana string of 4 or more characters matches with any of those in Table 7, the heuristic rule module 12 does not place any breaks, otherwise the heuristic rule module 12 places a break between the kanji and the last katakana.

TABLE 6

Katakana/Kanji Combination
Exception Prefix

| | | | | | | | |
|---|---|---|---|---|---|---|---|
| 不 | 4e0d | 俳 | 4ff3 | 四 | 56db | 昨 | 6628 |
| 丹 | 4e39 | 再 | 518d | 大 | 5927 | 来 | 6765 |
| 竝 | 4e7e | 北 | 5317 | 小 | 5c0f | 東 | 6771 |
| 亜 | 4e9c | 南 | 5357 | 庵 | 5ec3 | 次 | 6b21 |
| 今 | 4eca | 双 | 53cc | 急 | 6025 | 歯 | 6b6f |
| 低 | 4f4e | 含 | 542b | 急 | 6025 | 段 | 6bb5 |
| 済 | 6e80 | 祇 | 7d19 | 超 | 8d85 | 非 | 975e |
| 炭 | 70ad | 脱 | 8131 | 逆 | 9006 | 高 | 9ad8 |
| 熟 | 71b1 | 蝶 | 8776 | 過 | 904e | 鼻 | 9f3b |
| 省 | 7701 | 彼 | 88ab | 金 | 91d1 | | |
| 穴 | 7a74 | 悟 | 8910 | 銀 | 9280 | | |
| 等 | 7b49 | 西 | 897f | 銅 | 92f3 | | |

TABLE 7

Exception Suffix

| | | | | | | | |
|---|---|---|---|---|---|---|---|
| 人 | 4eba | 帯 | 532f | 済 | 6e08 | 茶 | 8336 |
| 党 | 515a | 座 | 53a7 | 湾 | 6e7e | 草 | 8349 |
| 剤 | 5264 | 庶 | 5eab | 状 | 72b6 | 菌 | 83cc |
| 化 | 5316 | 弁 | 5f01 | 用 | 7528 | 虫 | 866b |
| 器 | 5668 | 式 | 5f0f | 病 | 75c5 | 製 | 88fd |
| 型 | 578b | 形 | 5f62 | 症 | 75c7 | 計 | 8a08 |
| 基 | 57fa | 性 | 6027 | 的 | 7684 | 語 | 8a9e |
| 堂 | 5802 | 教 | 6559 | 目 | 76ee | 説 | 8aac |
| 塔 | 5834 | 班 | 6591 | 石 | 77f3 | 賞 | 8cde |
| 塩 | 5869 | 族 | 65cf | 社 | 793e | 質 | 8cea |
| 家 | 5bb6 | 星 | 661f | 科 | 79d1 | 庶 | 9178 |
| 屋 | 5c5e | 桟 | 6a5f | 秒 | 79d2 | 鉛 | 925b |
| 山 | 5c71 | 油 | 6cb9 | 管 | 7ba1 | 鈦 | 9171 |
| 岩 | 5ca9 | 法 | 6cd5 | 糖 | 7cd6 | 銅 | 92fc |
| 島 | 5cf6 | 派 | 6d3e | 紙 | 7d19 | 隊 | 964d |
| 川 | 5ddd | 流 | 6d41 | 素 | 7d20 | 類 | 985e |
| 州 | 5dde | 海 | 6d77 | 鍵 | 8171 | 鳥 | 9ce5 |
| 市 | 5e02 | 液 | 6db2 | 腔 | 8266 | | |

Table 8 represents the characters delimiting an end of sentence that are utilized by the heuristic rule module 12 to identify character transitions in the stream of text.

TABLE 8

End of Sentence

The end of sentence is marked by the following characters:

| | |
|---|---|
| 。 | maur is the primary EOS marker. |
| 。 | maru followed by a close quotation mark can indicate EOS, except when it is followed by a particle. |
| ! | a close quotation mark followed by white spaces can indicate EOS when no maru can be found. |
| (space) | Since Japanese does not use spacing between words, a space indicates a break in a clause and it is most likely to be the end of sentence in the absence of maru. This is often seen at the end of a paragraph. |

Accordingly, under step 30 of FIG. 2, the heuristic rule analysis module1 12 searches for character-transitions enumerated in the above tables and identifies the character-transitions as either a break between characters or a link between characters. A break between characters will be also be a break between words. A link between characters will indicate a potential internal connection between characters within a character segment. Under step 32, the heuristic module 12 sets the character-transition tags associated with characters in the stream of text based upon the analysis performed under Step 30. Thereafter, at Step 34, the heuristic rule module 12 stores the set or identified determined character-transition tag associated with a particular character segment.

At Step 35, the heuristic rule module 12 passes all character-transition tag data to the statistical rule module 14. The statistical rule module will read the character-transition tag data, and only analyze those segment with unknown interior character-transitions. Subsequent processing of the character string after the processing by heuristic rule module 12 does not include processing of those character-transitions identified by the statistical rule analysis module 12.

Figure 3:
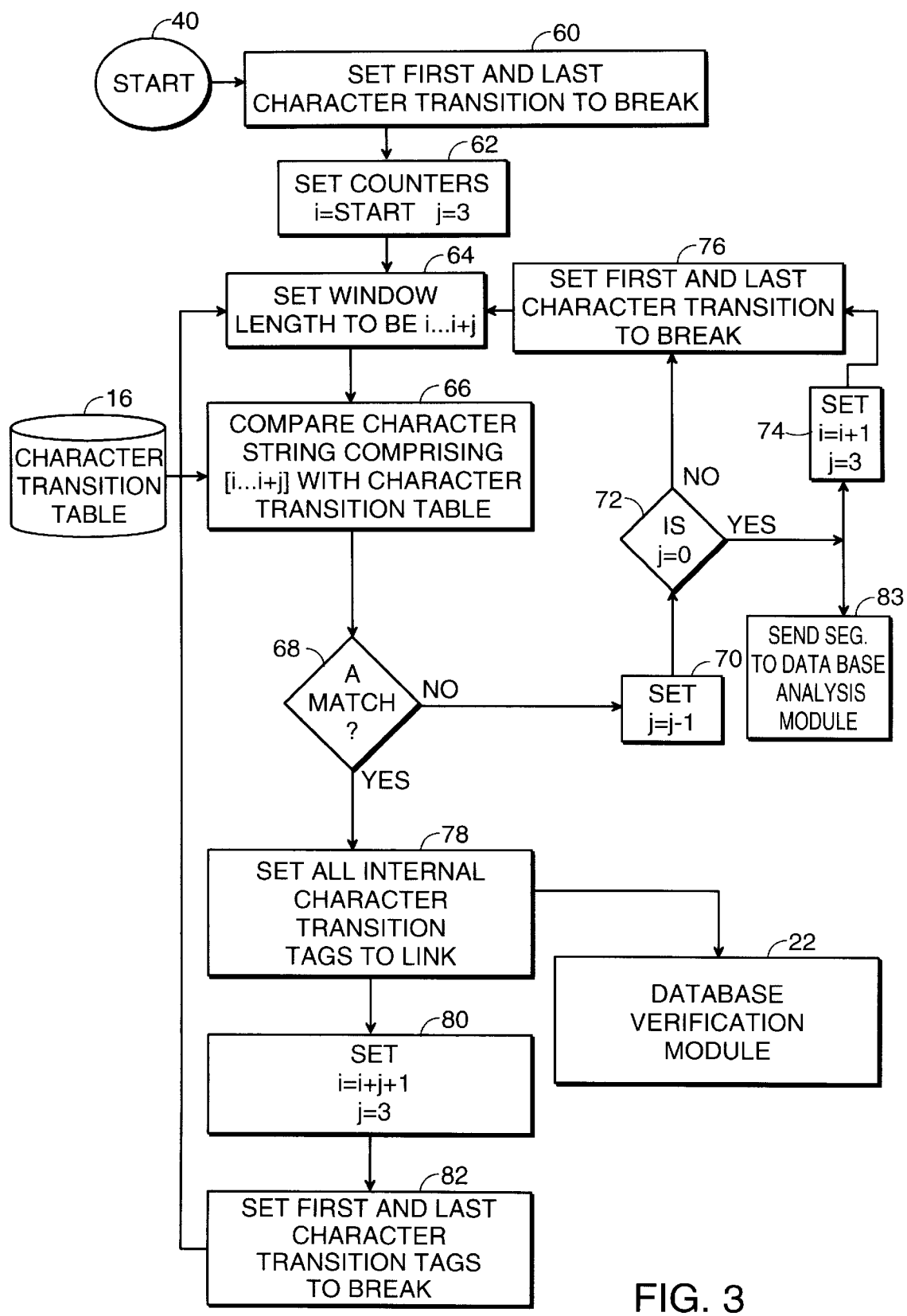
FIG. 3 is a flow chart illustrating the processing steps of the statistical analysis module of FIG. 1.

FIG. 3 illustrates a flow chart for implementing the statistical analysis module 20. The flow chart details a process whereby a window of successive characters in the stream of text is compared with the entries in a character-transition table. If the statistical analysis module identifies a match between the window of characters and an entry in the character-transition table, the statistical analysis module sets those character-transition tags associated with the characters in the current window. If no matches are found in the current window of characters, then the characters can be subjected to further analysis by the word breaker 5. After the current window of characters is processed, the statistical analysis module 20 slides the window across the input stream of text to review a different grouping of characters.

As shown in FIG. 3, sliding window analysis begins at Step 40 wherein the statistical rule module 20 receives a segment of character having at least one undefined character-transition therein. After Step 40, control proceeds to Step 60 for initialization. In step 60, the character-transition tag before the first character in the segment and after the last character in the segment are set to a break. This allows the system to approach the entire character group as an individual word. As processing continues, the default character-transition tags associated with the characters in the segment may be overwritten to identify either links or word breaks. Once a character-transition is changed from its default value to those values identifying either links or word breaks, the character-transition can not be changed. After Step 60, control proceeds to Step 62.

At Steps 62 and 64 the size of the sliding window is initialized. In the preferred embodiment, the sliding window has a maximum size of four characters and is decremented by one through each loop. Accordingly, at Step 62 a counter "i" is initialized to the starting address of the input text, and a counter "j" is set to one less than the desired window length. At Step 64, the window length is defined to run from "i" to "i+j".

At Step 66, the characters in the sliding window are compared with entries in the character-transition table 16 to identify character-transitions associated with the characters in the segment.

The character-transition table 16 is derived from analysis of a hand-broken corpus of approximately 200,000 character segments. The table 16 stores reliable information regarding high-frequency character-transitions. The corpus can include unigram, digram, trigram and quadgrams patterns. In the present invention, the corpus containing the data for the character-transition table has the following contents: character sequence; break pattern; frequency of break pattern; connection pattern; and frequency of connection pattern.

The corpus containing the data for the character-transition table is first run through the heuristic rule analysis module 12 to remove any segments which can be analyzed by the existing heuristic rules. This prevents the statistical analysis module 20 from duplicating the efforts of the heuristic analysis module 12.

Initial testing of the character-transition table data using the full hand-broken corpus showed the following results:

|  | all patterns | ambiguous patterns | unambiguous patterns | precentage of unambiguous patterns |
|---|---|---|---|---|
| unigrams | 2,389 | 1,632 | 757 | 32% |
| digrams | 57,069 | 9,732 | 47,337 | 83% |
| trigrams | 157,116 | 7,316 | 149,800 | 95% |
| quadgrams | 222,443 | 3,614 | 218,829 | 98% |

The character-transition table in the present invention preferably comprises data on unigram [single character-transitions], digram [two character-transitions], trigram [three character-transitions], and quadgram [four character-transitions], which leads to a maximum of ten (10) bits of information attached to the quadgram pattern.

In the character-transition table a n-gram pattern would be represented by "n" linked tables. In the present invention a 4 table mechanism would be needed. In the present invention, the first table of the character-transition table 14 would be:

| Unicode-character-code | start-pos | number. |
|---|---|---|

The first field represents the unicode value of the character code, start-pos represent the portion at which the rest of the pattern starts in the next (i.e., 2nd) table, and number is the number of patterns which have this character as the starting character. Therefore the number of n-gram patterns which start with the character in the first field and having sub patterns in the second table is represented by the value of the number field. The structure of the rest of the tables is similar except that a uni-gram pattern would be having a /0 in the second table and the 2nd field would have the bit map of the pattern. Similarly, the digram patterns would have the /0 in the first field of the third table and the bit map in the 2nd field of the third table.

With continued reference to FIG. 3, after the comparison process with the character-transition table at Step 66, control proceeds to Decision Step 68. If no match with an entry in the character-transition table is found, then logical flow proceeds to Step 70. If a match with an entry in the character-transition table is found, then logical flow proceeds to Step 78.

At Step 70, the window length variable is reduced by one thereby reducing the size of the window of characters. At Step 72, the size of the window is reviewed to determine whether the window still exists. If the window includes at least one character, then processing flows back to Step 64 through Action Box 76. The result of Steps 70, 72, and 76 is to incrementally reduce the size of the sliding window in an attempt to match the characters in the window with smaller entries in the character-transition table. However, if the window is reduced to the point where it does not include any characters and a match in the character-transition table has not been found, then processing flow to Steps 74 and 83.

At Step 74, the counter "i" is incremented by 1 and the counter "j" is set to 3. This causes the sliding window of successive character to slide to the right by one, and resets the size of the sliding window to four characters in length. After Step 74, control returns to Action Box 76.

At Step 83, those segments in the character string that still have undefined character-transitions after being processed by the Statistical Analysis module 20, are passed to the Database analysis module 24 for further processing.

At Step 78, the statistical analysis module 20 stores the new character-transition tag values for the matched character segments. After Step 78, the statistical analysis module 20 increments the memory location counter "i" and resets the window length variable to three, at Step 80. After Step 80, control proceeds to Step 82. At Step 82, the first and last character-transitions in the next segment having an undefined character-transition is set to a break. After Step 82, control returns to Step 64.

Example of Heuristic Analysis and Sliding Window Statistical Analysis

The input stream of text 12NEWBOOKS needs to be analyzed. The heuristic rule module 12 identifies the number 12 and then passes the segment NEWBOOKS on to the statistical analysis module 20.

The Character-transition table 16, for this example, contains the following character-transitions:

| [N E W] | 01111101 |
|---|---|
| [W B] | 010001 |
| [B O O] | 00111101 |
| [K S] | 111101 |

Step 1:
The initial bitmap representation for NEWBOOKS is set to 0001010101010100 because only the first and last transition are known as breaks at this point:
$_{00}N_{01}E_{01}W_{01}B_{01}O_{01}O_{01}K_{01}S_{00}$
First Window:
Step 2:
The counter i is initialized to 1.
Step 3:
The sliding window is defined as [1 2 3 4]=[N E W B].
Step 4:
The sequences for the current window which can be looked up in the Character-transition Table are:
[N E W B] [N E W] [N E] [N]
  (1) [N E W B] is looked up in the Character-transition Table and not found.
  (2) [N E W] is looked up in the Character-transition Table; it is found with the bitmap 01111101 which is merged with the existing bitmap:

| $_{00}N_{01}E_{01}W_{01}B_{01}O_{01}O_{01}K_{01}S_{00}$ | + |
|---|---|
| $_{01}N_{11}E_{11}W_{01}$ | = |
| $_{00}N_{11}E_{11}W_{01}B_{01}O_{01}O_{01}K_{01}S_{00}$ | |

Second Window:
Step 5:
  i is set to 2.
Step 3:
  The sliding window is defined as [2 3 4 5]=[E W B O].
Step 4:
  The sequences for the current window which can be looked up in the Character-transition Table are:
  [E W B O] [E W B] [E W] [E]

(1) [E W B O], [E W B], [E W], and [E] are looked up in the Character-transition Table and not found.

Third Window:
Step 5:
  i is set to 3.
Step 3:
  The sliding window is defined as [3 4 5 6]=[W B O O].
Step 4:
  The sequences for the current window which can be looked up in the Character-transition Table are:
  [W B O O] [W B O] [W B] [W]
    (1) [W B O O] and [W B O] are looked up in the Character-transition Table and not found.
    (2) [W B] is found with the bitmap 010001 which is merged with the existing bitmap:

$$_{00}N_{11}E_{11}W_{01}B_{01}O_{01}O_{01}K_{01}S_{00} \quad +$$
$$_{01}W_{00}B_{01} \quad =$$
$$_{00}N_{11}E_{11}W_{00}B_{01}O_{01}O_{01}K_{01}S_{00}$$

Fourth Window:
Step 5:
  i is set to 4.
Step 3:
  The sliding window is defined as [4567]=[B O O K].
Step 4:
  The sequences for the current window which can be looked up in the Character-transition Table are:
  [B O O K] [B O O] [B O] [B]
    (1) [B O O K] is looked up in the Character-transition Table and not found.
    (2) [B O O] is found with the bitmap 00111101 which is merged with the existing bitmap:

$$_{00}N_{11}E_{11}W_{00}B_{01}O_{01}O_{01}K_{01}S_{00} \quad +$$
$$_{00}B_{11}O_{11}O_{01} \quad =$$
$$_{00}N_{11}E_{11}W_{00}B_{01}O_{11}O_{01}K_{01}S_{00}$$

Fifth Window:
Step 5:
  i is set to 5.
Step 3:
  The sliding window is defined as [5 6 7 8]=[O O K S].
Step 4:
  The sequences for the current window which can be looked up in the Character-transition Table are:
  [O O K S] [O O K] [O O] [O]
    (1) [O O K S], [O O K], [O O], and [O] are looked up in the Character-transition Table and not found.

Sixth Window:
Step 5:
  i is set to 6.
Step 3:
  The sliding window is defined as [6 7 8]=[O K S].
Step 4:
  The sequences for the current window which can be looked up in the Character-transition Table are:
  [O K S] [O K] [O]
    (1) [O K S], [O K], and [O] are looked up in the Character-transition Table and not found.

Seventh Window:
Step 5:
  i is set to 7.

Step 3:
  The sliding window is defined as [7 8]=[O K S].
Step 4:
  The sequences for the current window which can be looked up in the Character-transition Table are:
  [K S] [K]
    (1) [K S] is found with the bitmap 111101 which is merged with the existing bitmap:

$$_{00}N_{11}E_{11}W_{00}B_{11}O_{11}O_{01}K_{01}S_{00} \quad +$$
$$_{11}K_{11}S_{01} \quad =$$
$$_{00}N_{11}E_{11}W_{00}B_{11}O_{11}O_{11}K_{11}S_{00}$$

All transitions in the segment bitmap are now either '00' or '1', i.e., breaks or connections. The identified segments are thus:

$_{00}N_{11}E_{11}W_{00}B_{11}O_{11}O_{11}K_{11}S_{00} \rightarrow$ |N E W |B O O K S|

The statistical rule analysis module 20 splits the input segment NEWBOOKS into two segments NEW and BOOKS and identifies all segment-internal transitions. This means that the two new segments do not have to be analyzed anymore, and the segments are passed directly to the output module 26.

The sliding window output may produce any one of three different results for an input segment. The first, all transitions are identified as either a break or a link, and each entire segment may be verified by the database verification module 22 with a single lookup. The second, some transitions are identified. In this case, any identified transitions will be passed onto the database analysis module 24, which reduces the overall processing required to identify the word breaks. The third instance would be where no character-transitions are identified. In this instance, a full analysis by the database analysis module 24 is required.

Figure 4:
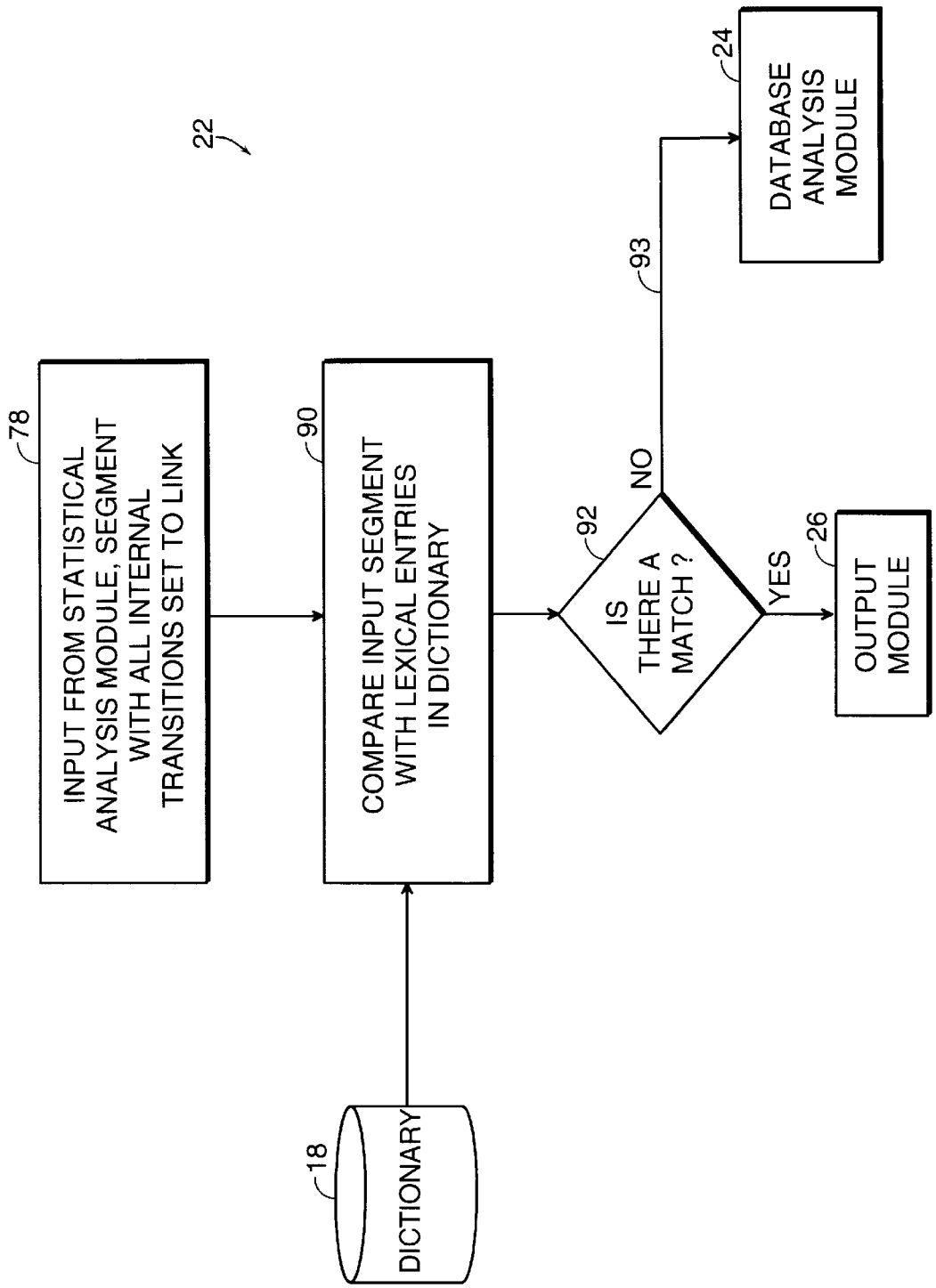
FIG. 4 is a detailed flowchart showing the steps of the database verification analysis of FIG. 1.

FIG. 4 illustrates a flow chart for implementing the database verification module 22. An input is supplied from the statistical analysis module 20, which is an identified work, i.e., a character segment with a break before the first character, a break after the last character, and all internal character-transitions are defined as a link between characters. In step 90, the character segment is compared with lexical entries in the dictionary 18. In step 92 if a match occurs, the character segment is sent to the output module 26. If no match occurs the character string is passed to the database analysis module 24 for a full database analysis. It will be appreciated by those skilled in the art, that since the input text segment has been identified as a word, the comparing step, step 90, will compare the input text segment to one or two entries from the dictionary 18. Hence, since the number of lexical entries used is so small, any known method of sorting may be used to locate the lexical entries used to verify the identified word.

Figure 5:
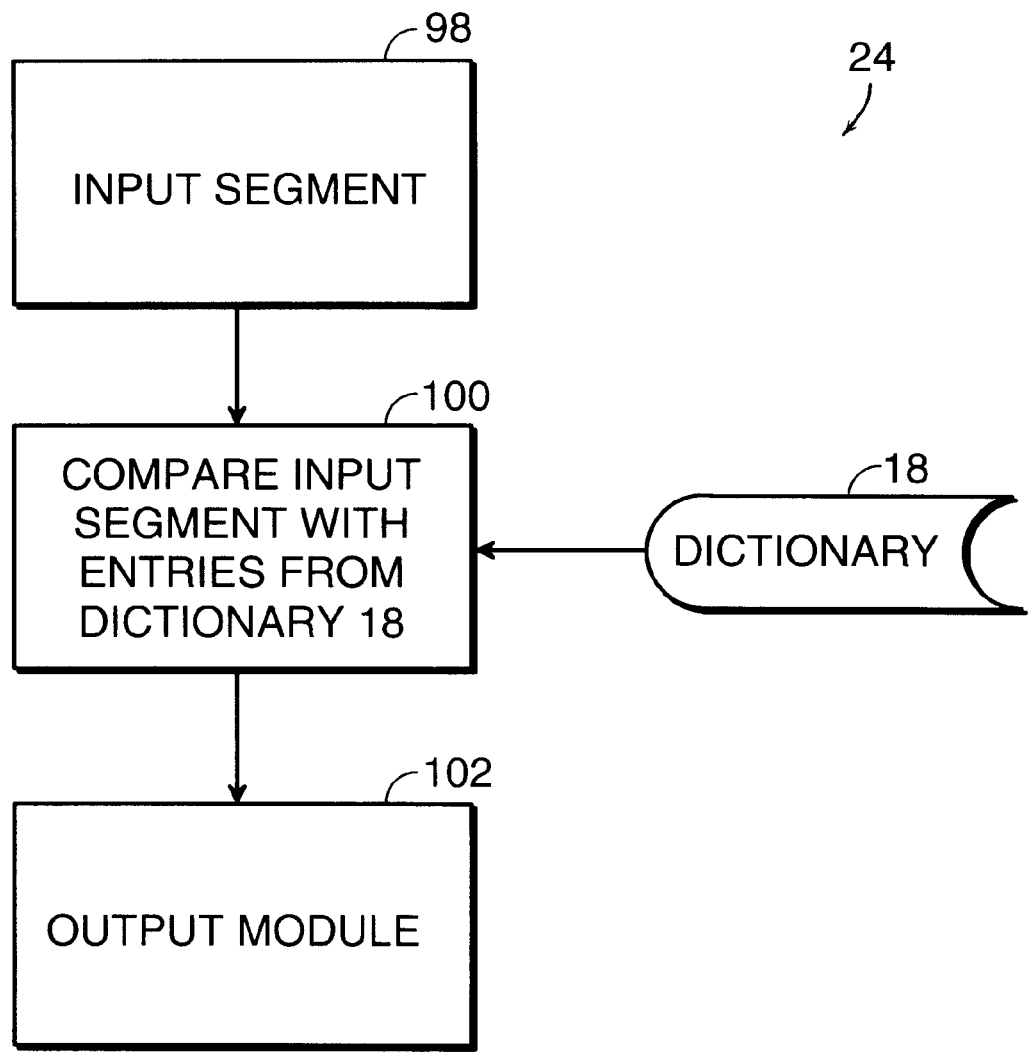
FIG. 5 is a flowchart illustrating the steps of the database analysis of FIG. 1.

FIG. 5 illustrates steps for implementing the database analysis module 24. At step 83 the database analysis module receives a segment of characters having unidentified character-transitions. The database analysis module can receive the segment from either the statistical analysis module 20 or the database verification module 22. In step 100, the character segment is compared with lexical entries in the dictionary 18 to identify a match for the character segment in the dictionary. Once a match for the character segment is identified, the unidentified character-transitions in the word segment are identified and the completed segment is forwarded to output module 26 with all word breaks being identified.

Figure 6:
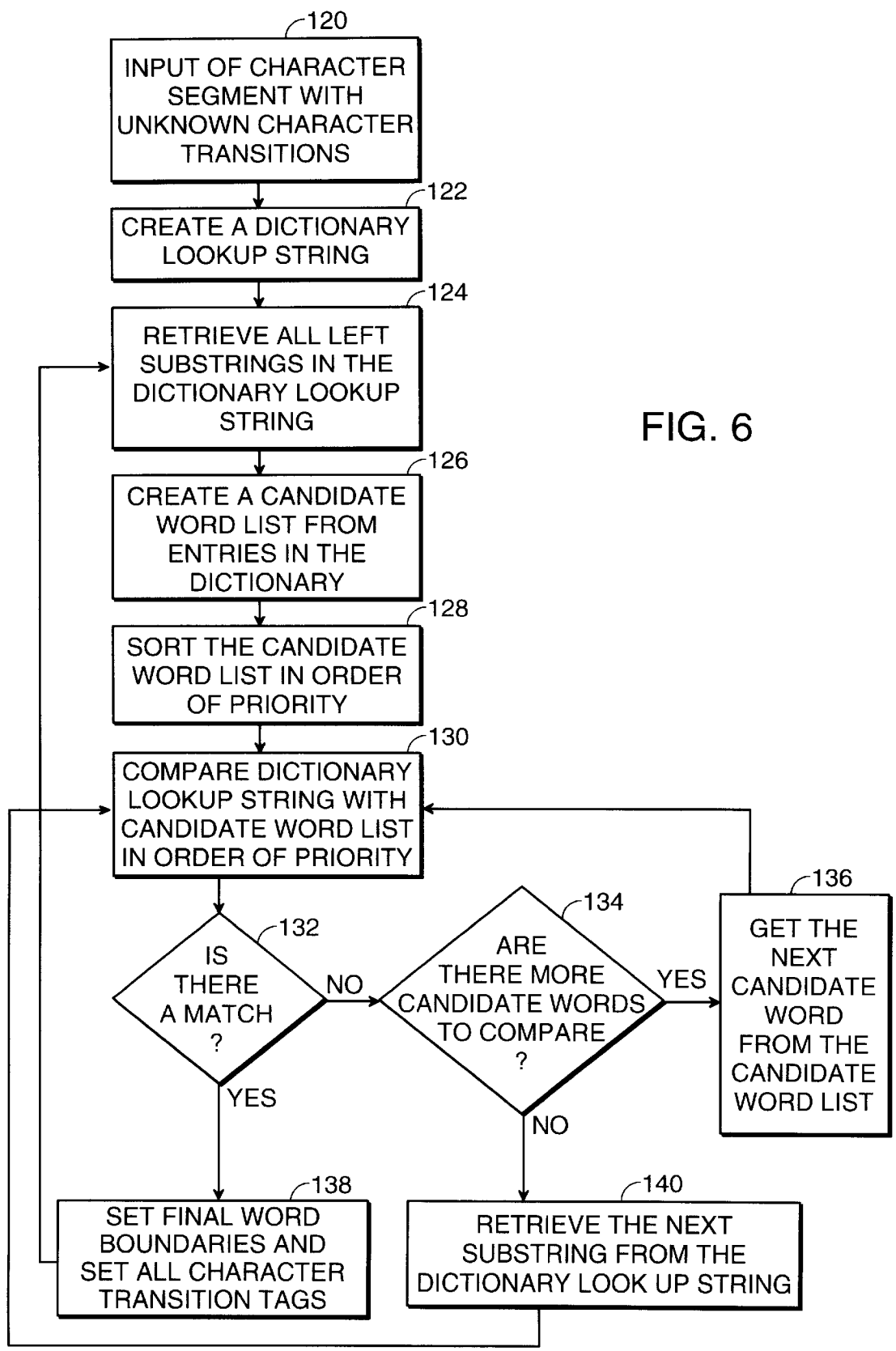
FIG. 6 is a detailed flowchart illustrating the comparison step of the database analysis procedure of FIG. 5.

FIG. 6 illustrates a flow chart detailing the comparison Step 100 of FIG. 5. At Step 120, the character segments with unknown character-transitions are input to the Database Analysis Module 24. After Step 120, control proceeds to Step 122.

At Step 122, a dictionary-look-up string is created based upon the input data received at Step 120. Afterwards, at Step 124, all left sub strings of the dictionary look up string are chosen for analysis. After Step 124, control proceeds to Step 126.

At Step 126, all words found in the dictionary 18 that possibly match the dictionary look up string are stored in a candidate word list. Then, at Step 128, the candidate word list is sorted in order of priority. The database analysis module 24 can sort the candidate word list based on various criteria, such as the starting position in the candidate word list or the length of the entries stored in the candidate word list. After Step 128, flow proceeds to Step 130.

At Step 130, the first entry in the sorted candidate word list is compared to the dictionary look up string. At decision box 132, the database analyzer 24 determines whether there is a match. If a match is found, then control proceeds to Step 138 where the final word boundaries are set and all character-transition tags are set to either a break or a link, as determined by the matched entry in the candidate word list. The next dictionary look-up-string is then retrieved and the process repeated.

If a match is not found at Decision Box 132, then control proceeds to Decision Box 134. At decision box 134, the processor branches control to Step 136 if there are more words in the candidate word list, and the processor branches to Step 140 if there are no more words in the candidate word list. At Step 136, the next word from the candidate word list is retrieved for comparison with the dictionary lookup string. At Step 140 the next substring is retrieved from the dictionary look up string for the comparison at Step 130.

While the invention has been shown and described having reference to specific preferred embodiments, those skilled in the art will understand that variations in form and detail may be made without departing from the spirit and scope of the invention.

Having described the invention, what is claimed as new and secured by letters patent is:

1. A method for locating unidentified breaks between words in an input character string formed of a plurality of characters, the method comprising the successive steps of
    storing said input character string in a computer memory element,
    identifying at least one morpheme in a first segment of said stored character string,
    reducing the number of unidentified word breaks in said stored character string by locating a first word break in said first segment of said stored character string based upon said at least one morpheme, said first word break dividing said first segment into a first sub-segment and a second sub-segment, and
    locating further unidentified word breaks in said first and second sub-segments by comparing said first and second sub-segments to entries in a dictionary.

2. The method of claim 1, wherein said reducing step further includes verifying said first word break by matching a word preceding said first word break with a first entry in said dictionary and by matching a word following said first word break with a second entry in said dictionary.

3. The method of claim 1, wherein said identifying step includes the steps of locating word breaks and character-transitions by applying a set of rules to said stored character string to identify said at least one morpheme.

4. The method of claim 3, wherein said applying step further comprises
    forming a window of successive characters from said stored character string,
    comparing said window of successive characters to entries in a character-transition table, and
    identifying said window of successive characters that matches an entry in the character-transition table as said at least one morpheme.

5. The method of claim 4, further comprising the step of decreasing the size of said window of characters if no entries in said character-transition table match said window of successive characters.

6. The method of claim 4, further comprising the step of sliding the window of successive characters across said stored character string if no entries in said character-transition table match said window of successive characters.

7. The method of claim 4, including the step of forming the character-transition table by generating a minimum spanning set of character strings necessary to identify character-transitions.

8. The method of claim 7, wherein the spanning set of character strings includes a plurality of character strings having different lengths.

9. The method of claim 1, wherein said reducing step includes the steps of
    detecting a first character-transition in said stored character string based upon said at least one morpheme, and
    locating said first word break as a function of said at least one morpheme and said first character-transition.

10. The method of claim 9, wherein said locating step includes the step of concatenating a first character and a second character together when said first character-transition indicates the existence of a connection between characters.

11. The method of claim 9, wherein said locating step further comprises the step of identifying a break between a first character and a second character when said first character-transition indicates the existence of a break between characters.

12. The method of claim 1, wherein said locating step further comprises the steps of
    creating a lookup string from characters within said first sub-segment,
    identifying a dictionary entry that substantially matches said lookup string, and
    marking a second word break between the matched lookup string and a character that precedes the lookup string and marking a third word break between the matched lookup string and a character that follows the lookup string.

13. A method according to claim 12, further comprising the steps of creating a candidate word list from a dictionary as a function of said lookup string, and wherein said identifying step includes comparing an entry in said candidate word list with said lookup string.

14. The method of claim 12, further comprising the step of
    validating that the matched lookup string is a word.

15. The method of claim 14, wherein the step of validating the matched lookup string includes
    selecting an identified word, from the matched lookup string, and
    comparing said matched lookup string to a dictionary for determining the validity of the identified word.

16. The method of claim 1, further comprising the step, prior to said identifying step, of applying a set of heuristic rules to said stored character string to identify a character-transition in said first segment of said stored character string, said identification of a character-transition reducing the number of possible character combinations forming words in said stored character string.

17. The method of claim 16 further comprising the step of identifying a concatenation between characters in said first segment as a function of said heuristic rules.

18. The method of claim 16 further comprising the step of selecting said heuristic rules for identifying a break between characters in said first segment.

19. The method of claim 16, wherein said step of applying the set of heuristic rules further comprises locating a number in said stored character string, and identifying a character-transition that precedes and a character-transition that follows said located number.

20. The method of claim 16, wherein said step of applying the set of heuristic rules further comprises locating identifying punctuation in said stored character string, and identifying a character-transition that precedes and a character-transition that follows said located punctuation.

21. The method of claim 16, wherein said step of applying the set of heuristic rules further comprises locating identifying Roman letters in said stored character string, and identifying a character-transition that precedes and a character-transition that follows said located Roman letters.

22. The method of claim 16, wherein said step of applying the set of heuristic rules further comprises locating identifying classifiers in said stored character string; and identifying a character-transition that precedes and a character-transition that follows said located classifiers.

23. The method of claim 16, wherein said step of applying the set of heuristic rules further comprises locating identifying particles in said stored character string, and identifying a character-transition that precedes and a character-transition that follows said located particles.

24. The method of claim 16, wherein said step of applying the set of heuristic rules further comprises locating identifying honorific prefixes in said stored character string, and identifying a character-transition that precedes and a character-transition that follows said located honorific prefixes.

25. The method of claim 16, wherein said step of applying the set of heuristic rules further comprises locating an identifying emperor year in said stored character string, and identifying a character-transition that precedes and a character-transition that follows said located emperor year.

26. The method of claim 16, wherein said step of applying the set of heuristic rules further comprises locating identifying Kanji-Katakana character-transitions in said stored character string, and identifying a character-transition that occurs at said located Kanji-Katakana character-transition.

27. A programmable computer an apparatus for locating unidentified breaks between words in an input character string, comprising A) a computer memory element for storing the input character string, B) first memory means for storing a character-transition table including character segments of morphemes, C) second memory means for storing a dictionary, said dictionary including lexical entries, D) a statistical analysis module operably coupled with said first memory means storing character-transition table for reducing the number of unidentified word breaks by locating a first word break in a first segment of said input character string as a function of at least one statistical morpheme in said first segment, said first word break dividing said first segment into a first sub-segment and a second sub-segment, and E) a database analysis module operably coupled with said dictionary for locating substantially all of the remaining unidentified word breaks in said first and second sub-segments by comparing said first and second sub-segments with entries in said dictionary.

28. The apparatus of claim 27, wherein said statistical analysis module further comprises first processing means for identifying said at least one statistical morpheme in said first segment by comparing said first segment with entries in said character-transition table and for detecting a character-transition associated with said at least one statistical morpheme, and second processing means for locating a first word break in said first segment as a function of said at least one statistical morpheme and said character-transition.

29. The apparatus of claim 28, wherein said first processing means further comprises a windowing module for forming a window of successive characters from said first segment such that said window of characters can be compared with entries in said character-transition table.

30. The apparatus of claim 29, wherein said first processor module includes means for sliding said window of successive characters along said first segment of said input character string.

31. The apparatus of claim 29, further comprising means for changing the size of said window of characters.

32. The apparatus of claim 28, further comprising means for associating a character-transition tag with characters in said input string.

33. The apparatus of claim 32, wherein said means for associating a character-transition tag includes means for indicating a concatenation between successive characters.

34. The apparatus of claim 32, wherein said character-transition tag indicates a break between successive characters.

35. The apparatus of claim 27, wherein said database analysis module further comprises:

third processing means for identifying a match between said first sub-segment and an entry in said dictionary, and fourth processing means for locating a second word break in said first sub-segment as a function of said matched entry.

36. The apparatus of claim 27, further comprising:

a heuristic rule table including a set of heuristic rules, a heuristic rule module operably coupled with said heuristic rule table for identifying a character-transition in said first segment of said stored character string, such that the number of possible character combinations forming words in said stored character string are reduced.

37. The apparatus of claim 27, further comprising a word verification module, operably coupled with said dictionary, for verifying matches between an identified word in said input character string and dictionary entries.

38. The apparatus of claim 27, wherein said character-transition table includes character strings of morphemes that form a minimum spanning set necessary to identify character-transitions in said input character string.

39. The apparatus of claim 38, wherein the spanning set includes a plurality of character strings having different lengths.

40. A machine readable data storage medium, comprising means for reducing the number of unidentified word breaks in a character string by locating a first word break in a first segment of said character string as a function of at least one statistical morpheme in said first segment, said first word break dividing said first segment into a first sub-segment and a second sub-segment, and means for locating substantially all of the remaining unidentified word breaks in said first and second sub-segments by comparing said first and second sub-segments with entries in a dictionary of lexical entries.

41. The machine readable data storage medium of claim 40, further comprising a character-transition table including character segments of morphemes.

* * * * *